(43.)
W. H. H. Doty,
Comb'd. Double Shovel, Single Shovel and Covering Plow.
No. 122,162.   Patented Dec. 26, 1871.
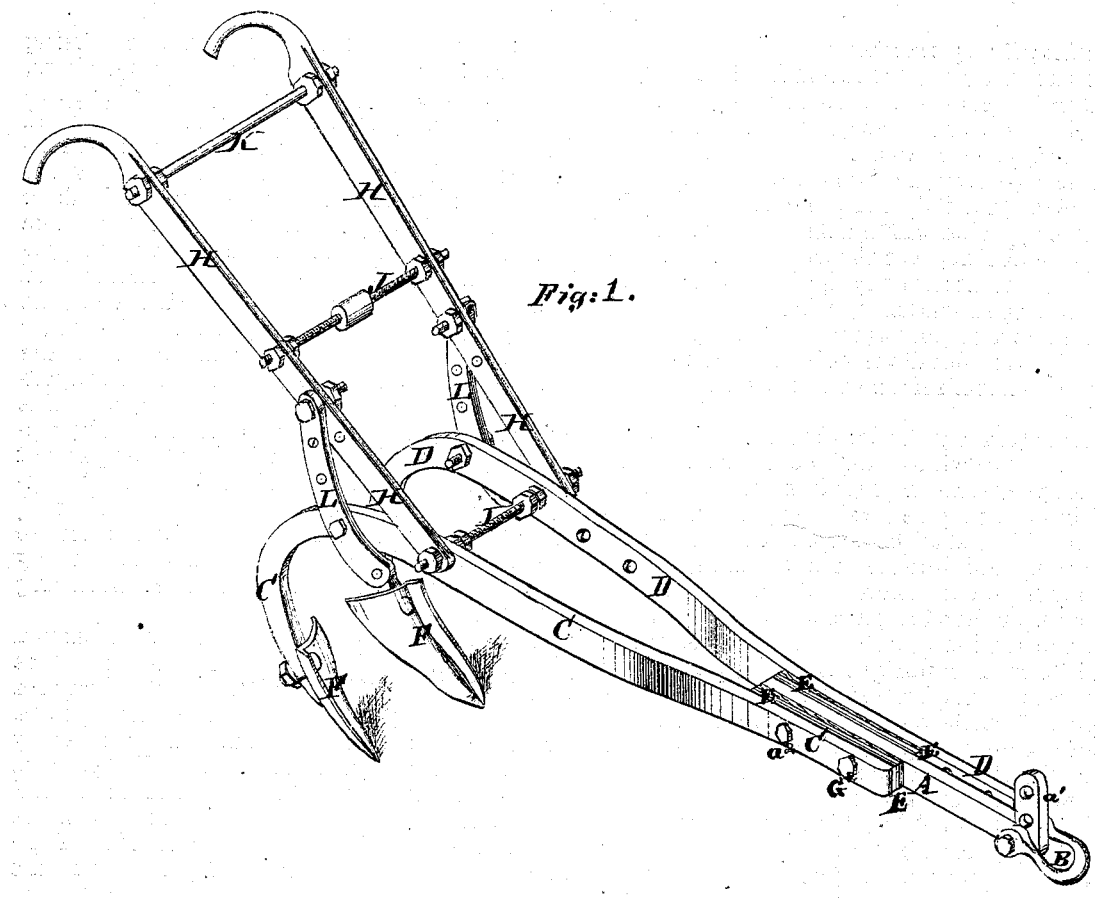
Fig: 1.
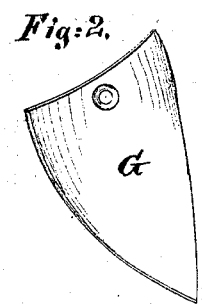
Fig: 2.
Witnesses:
M. Vorlaender
Wm. H. C. Smith.
Inventor:
W. H. H. Doty.
Per Munn & Co.
Attorneys.

UNITED STATES PATENT OFFICE.

WILLIAM H. H. DOTY, OF SONORA, OHIO.

IMPROVEMENT IN PLOWS.

Specification forming part of Letters Patent No. 122,162, dated December 26, 1871.

*To all whom it may concern:*

Be it known that I, WILLIAM H. H. DOTY, of Sonora, in the county of Muskingum and State of Ohio, have invented a new and useful Improvement in Combined Double-Shovel, Single-Shovel, and Covering-Plow; and I do hereby declare that the following is a full, clear, and exact description thereof, which will enable others skilled in the art to make and use the same, reference being had to the accompanying drawing forming part of this specification, in which—

Figure 1 is a perspective view of my improved plow. Fig. 2 is a detail view of one of the shovels.

Similar letters of reference indicate corresponding parts.

My invention has for its object to furnish an improved plow, which shall be so constructed that it may be readily adjusted for use as a double-shovel plow, a single-shovel plow, or a covering-plow, and which shall be simple in construction, light, strong, and durable; and it consists in the construction and combination of the various parts of the plow, as hereinafter more fully described.

A is the draft-bar, upon the forward end of which is formed an upright arm, $a^1$, having holes in it to receive the bolt of the clevis B, so that the point of draft attachment may be raised or lowered to cause the plows to run deeper or shallower in the ground, as may be required. In the rear part of the draft-bar A are formed two holes to receive the bolts $a^2$, by which the forward parts of the plow-beams C D are secured to the said draft-bar A. Two sets of holes are formed in the forward part of one of the plow-beams, as D, so that the beams may be readily adjusted to bring the plows in line with each other transversely, to adjust it for use as a covering-plow, or one in advance of the other to adjust it for use as a double-shovel plow. The beams are adjusted laterally by strips E, of metal or wood, some of which should be wedge-shaped, interposed between the said beams and draft-bar, as shown in Fig. 1. The rear parts of the beams C D are curved, as shown in Fig. 1, to bring their rear ends into proper position to receive the plows and to adapt them to serve as standards to said plows. The plows may be made with flanges upon their outer sides, as shown at F, Fig. 1, to throw the soil around the plants being cultivated or over the seed being covered; or they may be ordinary shovel-plows, as shown at G, Fig. 2, or of any other form, according to the particular work to be done. H are the handles, the lower ends of which are secured to the beams C D by the long bolt I, which passes through the said beams and holds them in proper relative position when adjusted. The middle parts of the handles H are held in position by the round J, which has a collar formed upon its middle part, and with which the handles are adjustably connected by nuts. The upper ends of the handles H are held in position by the round K, with which the said handles are adjustably connected by nuts, as shown in Fig. 1. The handles H are adjustably supported at their proper elevation by the braces L, the lower parts of which are bolted to the beams C D, and the upper parts of which are bolted to the handles H, several holes being formed in the said braces to receive the said bolts, so that the handles may be readily adjusted higher and lower, according to the height of the plowman.

In adjusting the plow for use as a single-shovel plow, one of the beams C D is detached. The bolt I is passed to its middle part through a hole in the remaining beam and secured by nuts. The lower ends of the handles H are secured by nuts to the end parts of the bolt I. The handles are adjusted in proper position upon the rods J K, and secured by nuts. The lower ends of the braces L are bolted to the opposite sides of the beam and their upper ends are placed upon the end parts of the rod J and secured by nuts.

This construction also enables the plow to be taken apart and packed in very small space for convenience of storage or transportation.

Having thus described my invention, I claim as new and desire to secure by Letters Patent—

The longitudinally-adjustable frame A C D, combined, as described, with a pair of handles, H H, pivoted thereto, and supported by adjustable braces L L, so that the handles and beams can be simultaneously and correspondingly adjusted, as set forth.

WILLIAM H. H. DOTY.

Witnesses:
LEVI LEE,
AUGUSTUS MILLER.

(114)